Aug. 22, 1967  J. B. PUCKETT  3,336,671
COMPARISON INSTRUMENT
Filed Sept. 17, 1964
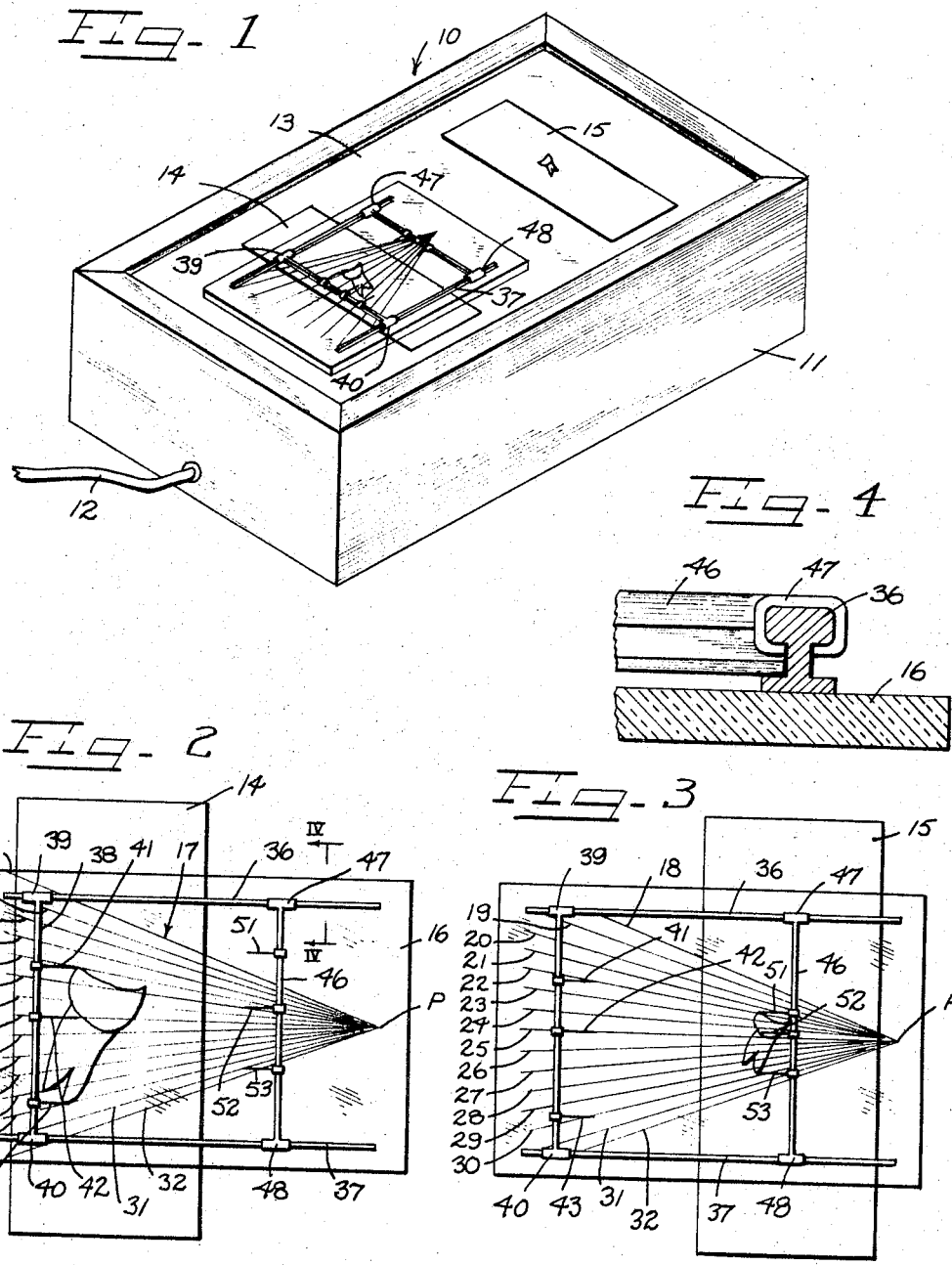
INVENTOR.
JOHN B. PUCKETT
BY
ATTORNEYS

United States Patent Office 3,336,671
Patented Aug. 22, 1967

3,336,671
COMPARISON INSTRUMENT
John B. Puckett, 1501 Arizona, Suite 14B,
El Paso, Tex. 79902
Filed Sept. 17, 1964, Ser. No. 397,220
4 Claims. (Cl. 33—1)

ABSTRACT OF THE DISCLOSURE

Comparison device for comparing X-ray pictures and the like including a base on which the transparency is arranged to be positioned, the base having a plurality of lines radiating from a common point about a center line, with a plurality of pointer means positioned coaxially along an axis perpendicular to the center line, the pointer means being movable to rotate points of reference on the picture for comparison with corresponding reference points on another picture to thereby determine deviations between the two representations.

---

The present invention relates to an improved comparison device, particularly useful for comparing X-rays.

In tracing the progress of bone growth or tumor growth it is necessary to make a visual comparison between X-rays taken at widely spaced intervals. No two X-rays, however, are taken with exactly the same distance, or at exactly the same angle. Hence, a visual comparison of two such X-rays would necessarily lead to the correct conclusion regarding the condition being investigated.

The device of the present invention makes it possible to compare X-rays taken at different angles and/or at different distances so that the progress of various conditions may be quickly and accurately ascertained. The device of the present invention is particularly useful in comparing jaw and alveolar bone development. It is also useful for following the growth or dimensional changes of cysts, tumors, exostoses, torii, and the like. It can be used to determine the length of a root of a tooth when the length of the anatomical crown is known. In addition to its use in the field of medicine and dentistry, it finds use in any field where problems of projection are present.

One of the objects of the present invention is to provide a simple device for comparing X-rays and the like to compensate for differences in size and angulation between the two pictures.

Still another object of the invention is to provide a device which can be used to provide an absolute measurement of the area under consideration, as well as the rapid indication of any growth or diminution of the area which has occurred since the preceding X-ray.

Other objects and features of the present invention will become apparent to those skilled in the art from the following detailed description of the attached sheet of drawings which illustrates a preferred embodiment of the invention.

In the drawings:

FIGURE 1 is a view in perspective of a shadow box showing the manner in which the comparison device of the present invention may be positioned in use;

FIGURE 2 is a plan view illustrating the manner in which the pointers of the comparison device are aligned in making the original evaluation of one X-ray film;

FIGURE 3 is a view similar to FIGURE 2 in showing the manner in which the comparison device is aligned with the smaller of the two X-rays for comparison purposes; and FIGURE 4 is an enlarged cross-sectional view taken substantially along the line IV—IV.

As shown in the drawings:

In FIGURE 1, reference numeral 10 indicates generally a shadow box of the type commonly used for viewing X-ray films. The box 10 includes a container 11 in which there is located a suitable source of illumination (not shown) energized by means of an electrical lead 12. The face of the shadow box consists of a ground blass viewing screen 13 upon which a pair of X-ray films 14 and 15 are disposed for comparison purposes.

The physical structure of the comparison device of the present invention is best illustrated in FIGURES 2 and 3 of the drawings. It includes a transparent base 16 composed of glass or synthetic resin, or the like. Inscribed on the base 16, as by means of etching or the like, is a plurality of radially extending lines 17 extending from a common point labelled P in the drawings. The point P may be on the base 16 itself or the lines may converge to a point outside the physical limits of the base 16, depending upon the angularity and scale desired in the diverging lines 17. In the particular embodiment of the invention illustrated in FIGURES 2 and 3, there are 15 such diverging lines 17 extending from the point P, with each angular line being separated from the next adjacent line by a common angular difference. These lines have been identified at reference numerals 18 through 32, inclusive. It will be noted that the center one of the lines, identified at reference numeral 25 substantially coincides with the longitudinal center line of the base 16.

A pair of guide rails 36 and 37 are secured to the base 16 in parallel spaced relationship, on opposite sides of the longitudinal centerline of the base 16. As best seen in FIGURE 4, the rails 36 and 37 may be generally in the shape of an I-beam. A transverse bar 38 has a pair of brackets 39 and 40 and at opposite ends thereof, the brackets 39 and 40 engaging the guide rails 36 and 37 respectively such that relative sliding movement is permitted between the bar 38 and the rails 36 and 37, but there is enough frictional force between the bar and the two rails to permit setting the bar 38 in a predetermined position along the diverging lines 18 through 32 without having the bar 38 slide freely with respect to the guide rails 36 and 37. A plurality of pointers 41, 42 and 43 are slidably received on the bar 38 so that each pointer may be independently adjusted within the field provided by the diverging lines 18 through 32. The fit between the pointers 41 to 43 and the bar 38 is sufficiently snug so that while the pointers 41, 42 and 43 may be readily moved along the bar 38, they will be retained in their present positions even upon tilting of the base 16 to a vertical position.

A similar bar and pointer assembly is provided by the provision of a bar 46 supported between brackets 47 and 48 which accommodate sliding movement of the bar 46 along the rails 36 and 37 when pressure is applied to the bar 46. A plurality of pointers 51, 52 and 53 are received along the length of the bar 46 for relative sliding movement with respect thereto. Again, the fit between the pointers 51 to 53 and the bar 46 is such that while the pointers can be moved by the application of pressure, they are not so loosely received that they will be displaced from their relative positions upon movement of the base 16.

In the operation of the device, the X-rays 14 and 15, taken at different times and from different angles, are first compared on the shadow box to determine which of the two is the longer, and what common landmarks they possess. For example, points of reference may be the incisal edge of the tooth, the apex of its root, a characteristic filling that can give a definite point from which to measure, and the like. The picture is then aligned with the comparison device so that its long axis is parallel to the bar 38. The pointers 41, 42 and 43 are then positioned in the following manner. The pointer 41 is placed on the upper edge of the tooth, and the pointer 43 is aligned with the bottom of the tooth. Then, the alveolar bone height is fixed by placing the pointer 42 at the appropriate level. In the illustrated instance of FIGURE 2, the pointer 41 intersects the diverging array of lines at line 22, the pointer 42 intersects at line 25, and the pointer 43 intersects at line 30. These pointers are then retained in that position, and the comparison device is moved to the smaller of the two X-rays, appearing on film 15. Again, the long axis of the tooth is aligned so that it is parallel with the bar 46 and the extremities of the tooth appear between lines 22 and 30. Now, by moving the pointer 52 to the position of the alveolar bone, it will become immediately apparent whether or not there has been growth or loss of bone structure. If the pointer 52 rests exactly on line 25, then no change has occurred since the last X-ray. If the pointer 52 is located above or below the line 25, then the viewer knows that either growth or depletion of the bone structure has occurred.

It should be evident that the size of the device, and the geometry of the lines, particularly with regard to their spacing, will vary substantially, depending upon the articles being compared.

It should also be evident that various other modification can be made to the described embodiment without departing from the scope of the present invention.

I claim as my invention:

1. A comparison device comprising a base, a plurality of lines on said base radiating from a common point about a centrally disposed reference line and a pair of indicator means each having a plurality of pointer means adjustably positionable with respect to said lines, each of said pointer means being positioned on a common axis perpendicular to said reference line.

2. A comparison device comprising a transparent base, a plurality of lines inscribed on said base radiating from a common point, a pair of guide rails secured in parallel spaced relation to said base, a first bar slidably mounted between said guide rails and perpendicular thereto, a plurality of individual pointer means slidably mounted on said first bar and being oriented towards said common point, a second bar slidably mounted between said guide rails and perpendicular thereto, and a plurality of individual pointer means slidably mounted on said second bar and being oriented away from said common point.

3. The comparison device of claim 2 in which said lines are etched into the surface of said base.

4. A comparison device comprising a transparent base, a plurality of lines on said base radiating from a common point, the center one of said lines substantially coinciding with the longitudinal center of said base, a pair of guide rails disposed in parallel spaced relation on opposite sides of said longitudinal center, a first bar extending perpendicular to said guide rails and slidably mounted with respect thereto, a plurality of pointers slidably mounted along said first bar, a second bar extending perpendicular to said guide rails and slidably mounted with respect thereto, and a plurality of pointers slidably mounted along said second bar.

References Cited

UNITED STATES PATENTS

| | | | |
|---|---|---|---|
| 1,232,290 | 7/1917 | Grunberg | 33—1 X |
| 1,643,436 | 9/1927 | Southerland | 33—143 |
| 2,087,102 | 7/1937 | Chandler | 33—76 |
| 2,547,745 | 4/1951 | Cade et al. | 33—1 |

LEONARD FORMAN, *Primary Examiner.*

WILLIAM D. MARTIN, *Examiner.*